United States Patent [19]
Rickel

[11] 3,761,986
[45] Oct. 2, 1973

[54] VEHICLE WASHING APPARATUS
[75] Inventor: Allen D. Rickel, Deerfield, Ill.
[73] Assignee: Trans-Clean, Inc., Glenview, Ill.
[22] Filed: Aug. 14, 1967
[21] Appl. No.: 660,369

[52] U.S. Cl.................. 15/21 D, 15/DIG. 2, 15/183
[51] Int. Cl. .............................................. B60s 3/06
[58] Field of Search...................... 15/DIG. 2, 21 C, 15/53, 97, 183; 200/61.41

[56] References Cited
UNITED STATES PATENTS
| | | | |
|---|---|---|---|
| 2,754,531 | 7/1956 | Rowland | 15/183 |
| 3,241,167 | 3/1966 | Murillo et al. | 15/21 C |
| 3,350,733 | 11/1967 | Hanna | 15/21 C |
| 3,428,982 | 2/1969 | Beer | 15/21 C |
| 3,443,270 | 5/1969 | Smith | 15/21 C |

Primary Examiner—Edward L. Roberts
Attorney—Hume, Clement, Hume and Lee

[57] ABSTRACT

Vehicle washing apparatus having a vertical brush mounted on an extensible-retractable double pivoted frame for following and washing front, side, and rear surfaces of the vehicle. The brush extends below and above the vehicle and has a plurality of vertical rows of relatively limp, pliant bristles. It is rotated with the direction in which the vehicle is moving within a predetermined rotational speed range to provide a unique operational action causing the brush to conform to the profile of the vehicle. Aerial sensing means are provided for shutting off the brush motor momentarily to prevent damage to aerials, and override means are provided to prevent the vehicle upper body structure from shutting off the brush motor by contact with the aerial sensing means. A multiplicity of vertical rows of short, relatively stiff, resilient bristles are preferably interspersed with the rows of limp, pliant bristles in the brush to provide a cushioning core for the brush.

13 Claims, 26 Drawing Figures

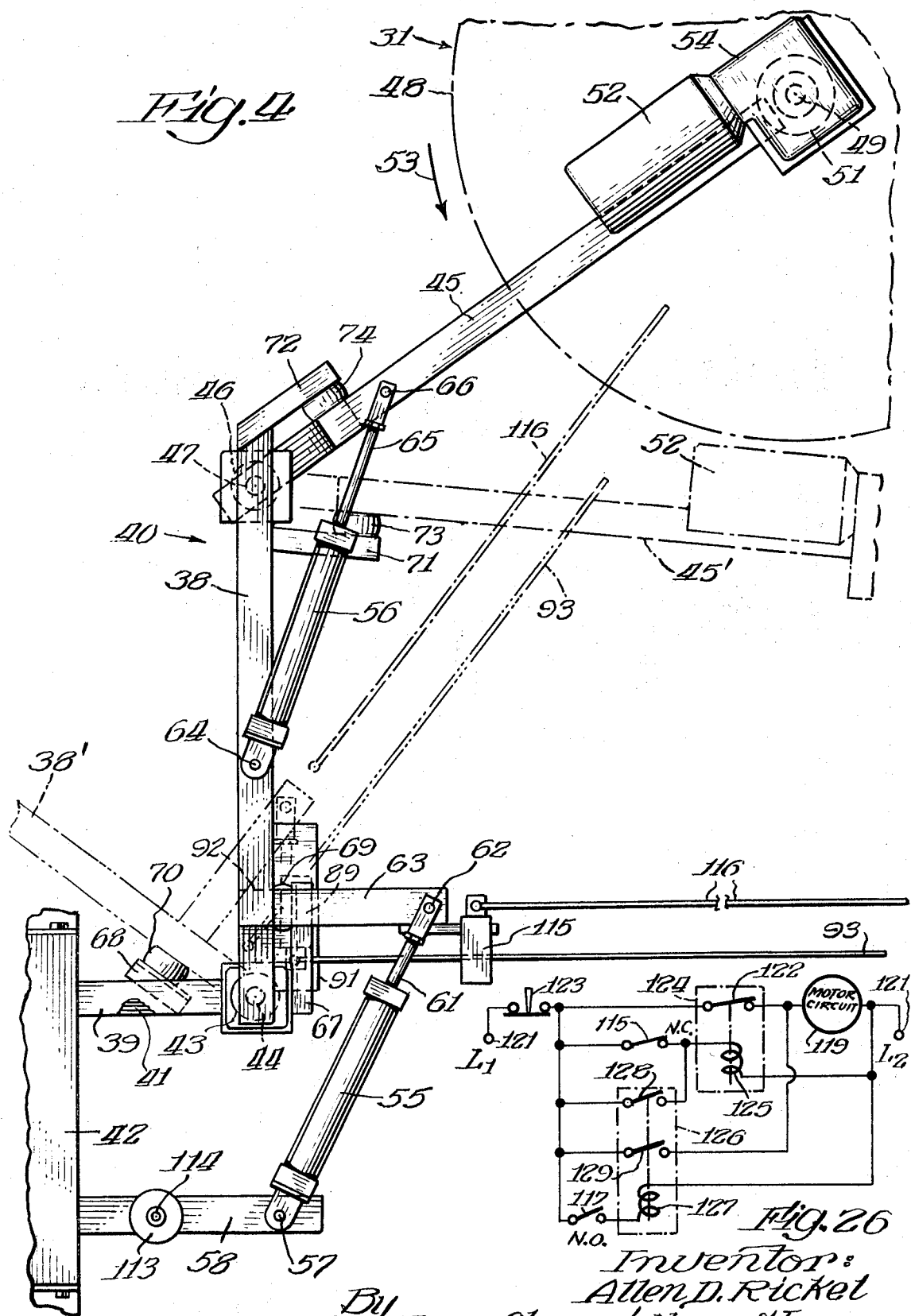

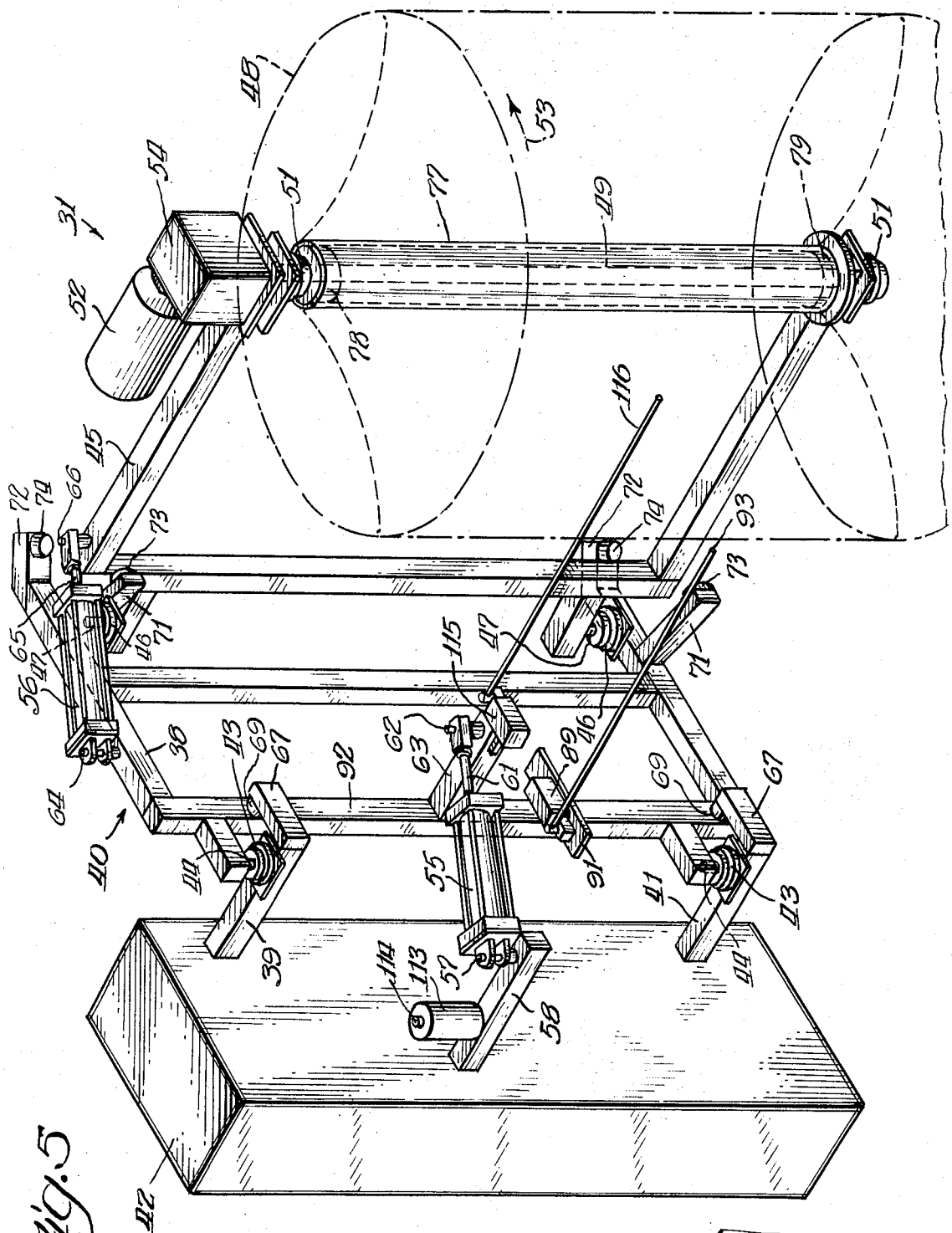

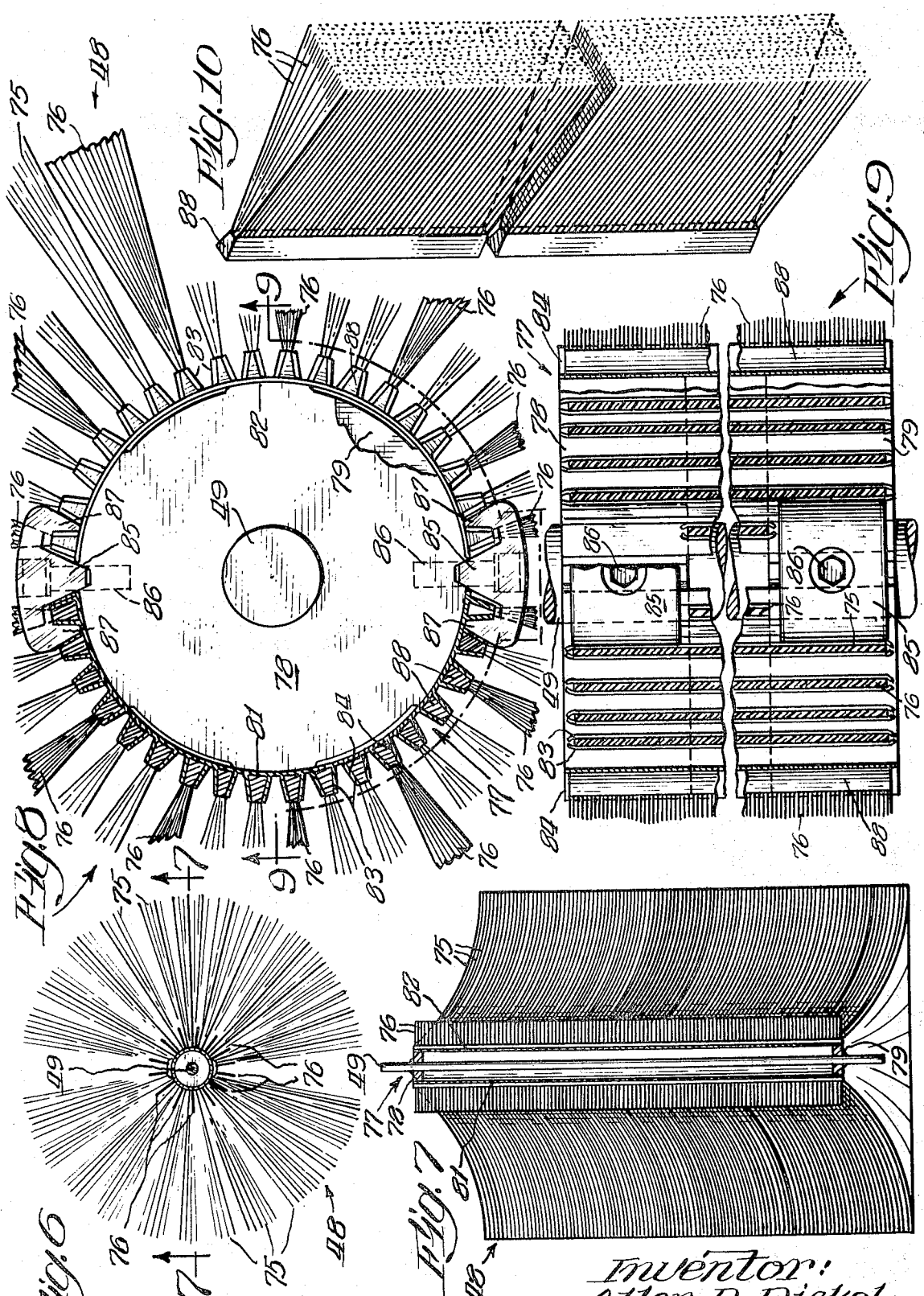

Inventor:
Allen D. Rickel
By Hume, Clement, Hume & Lee Attys.

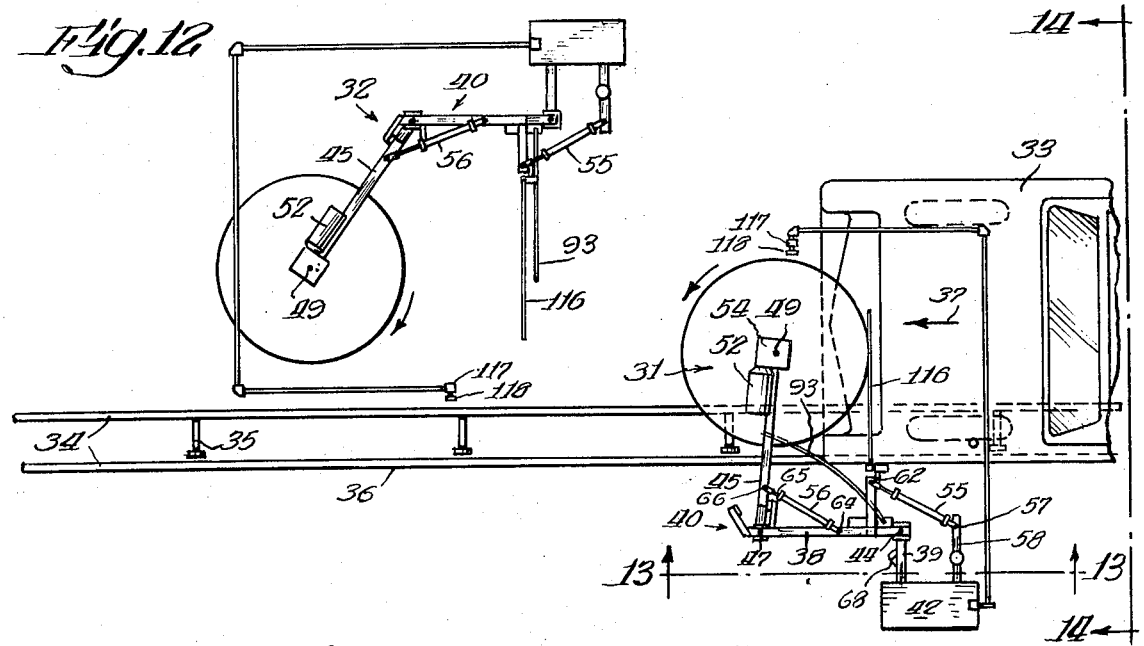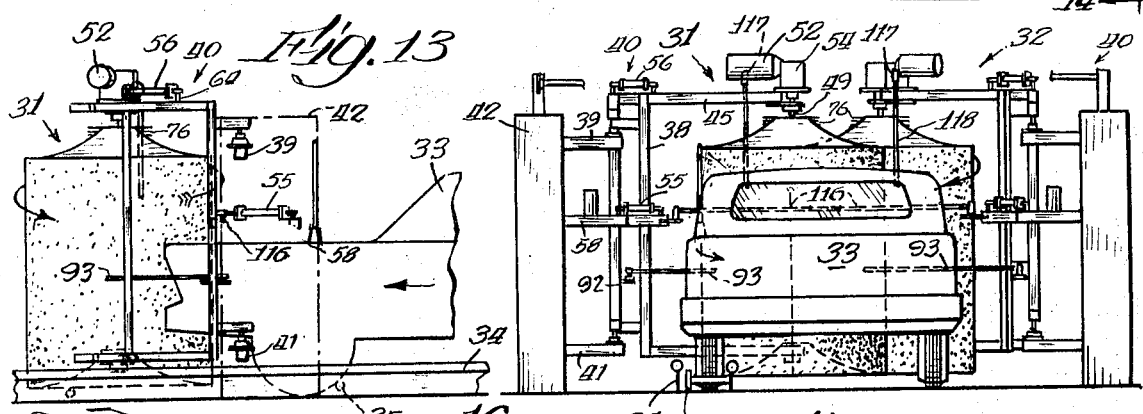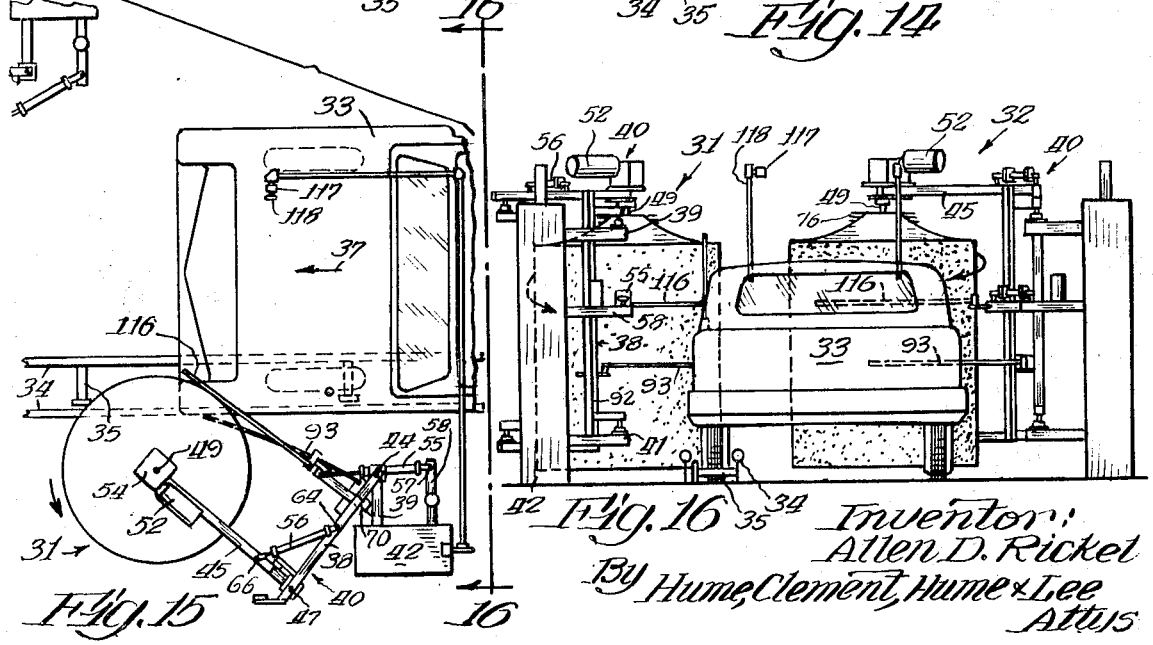

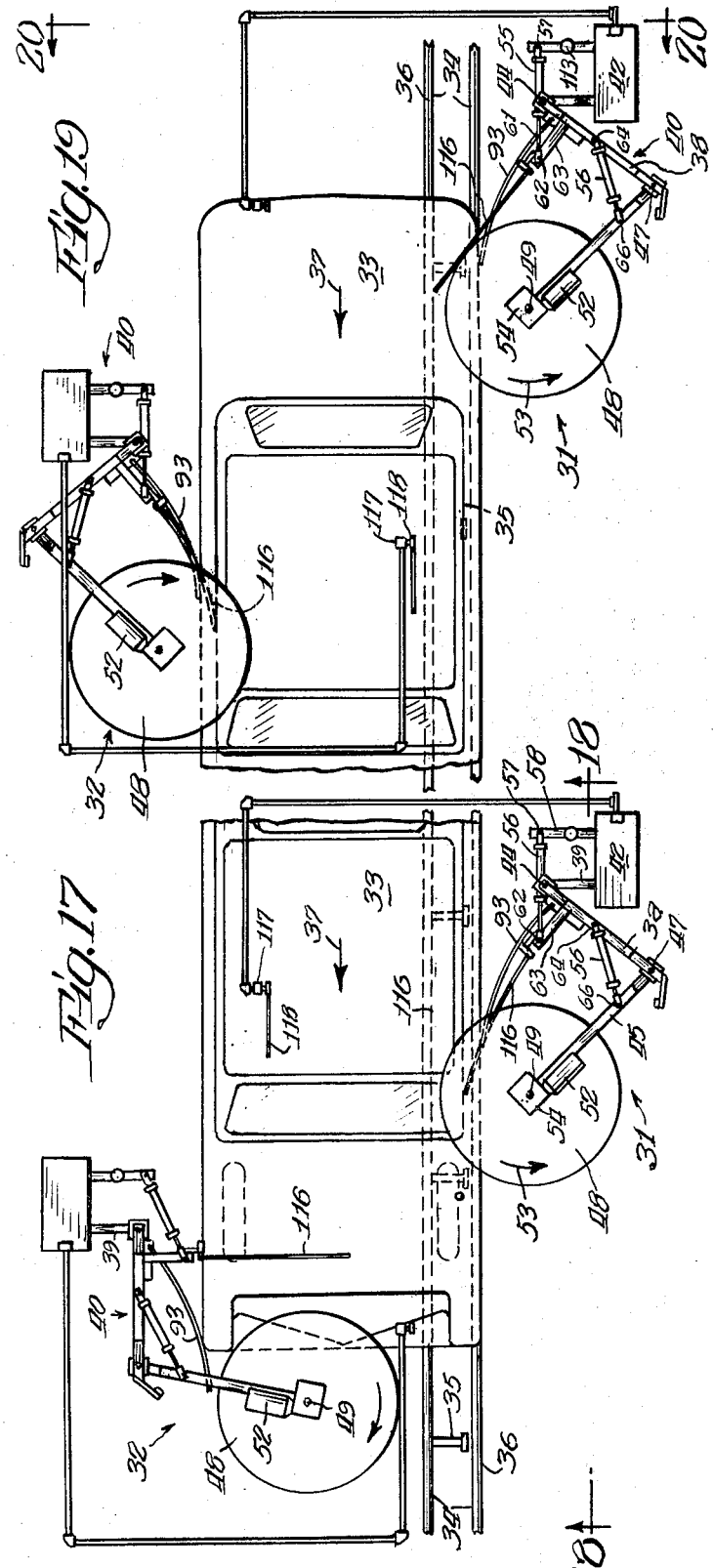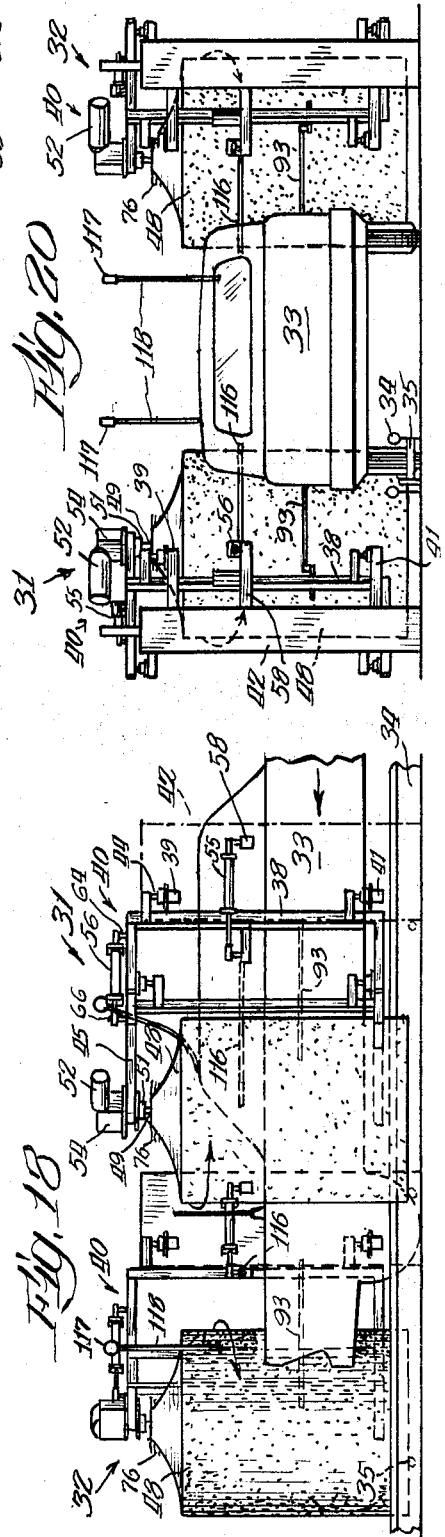

VEHICLE WASHING APPARATUS

This invention relates to apparatus for washing vehicles, such as automobiles, being moved along a predetermined course. More particularly, this invention relates to a vertically-oriented wrap-around brush apparatus for following and washing front, side, and rear surfaces of the vehicle.

Although it has been known to employ vertically oriented rotating brushes for washing the side of a vehicle being moved past the washing station, the brush arrangements of the prior art have been attended by many problems which have prevented the use of such vertically-oriented brushes to optimum advantage. For example, because of the presence of radio aerials on many automobiles, vertical brushes are frequently dimensioned and arranged such that the bristles will not engage the radio aerials which are likely to be damaged or ripped from the vehicle by engagement with the rotating brush. In fact, it has been known to employ complex arrangements of plural vertical brushes for washing one side of the vehicle with the various vertical brushes being arranged so that there will be no appreciable overlap with the hood, fender top or rear deck surfaces of the vehicle, thereby preventing engagement of radio aerials which are conventionally mounted on or adjacent these surfaces. The result, however, is not only to increase the cost of the brush apparatus but also to unduly limit the capability of the brush apparatus to conform to the contours and profile of the vehicle.

It is a principal object of the present invention to provide apparatus including a vertically-oriented brush which has a vertical dimension extending from below the underbody surfaces of the vehicle to above the roof surfaces of the vehicle and which has an effective radius and movement such that the brush will conform to the contours and profile of the vehicle to overlap and wash appreciable portions of the horizontal hood, fender top, roof, and rear trunk deck surfaces in addition to the vertical surfaces of the front, side, and rear of the vehicle.

It is a further principal object of the present invention to provide means for sensing a radio aerial and de-energizing the brush motor momentarily to prevent damage to the sensed radio aerial and to provide override means for preventing brush motor de-energization due to contact with the upper body structure of the vehicle by the aerial sensing means.

Another problem encountered with brushes of the prior art has been damage to the vehicle due to factors such as speed of rotation of the brush and the action of power operated frame structures carrying the brush.

It is therefore another principal object of the present invention to provide a brush unit of the wrap-around type having a gentle action provided by the unique employment of a drawing effect on the brush in the operational action of the brush unit.

Moreover, in brushes of the wrap-around type which engage and wash front, side, and rear surfaces of the vehicle, the brush can become trapped in recesses in the front of the vehicle, a condition which tends to impair the washing operation and which may result in damage to either or both the vehicle and the brush.

It is a further object of the present invention to provide a central cushioning core in the brush of short, relatively stiff, resilient bristles to prevent the brush from becoming trapped in frontal recesses in the vehicle and to prevent damage to projecting portions of the vehicle.

It is a still further object of the present invention to provide vehicle washing apparatus which is characterized by increased versatility with minimum complexity.

These and other objects and features of the invention will be better understood by reference to the following detailed description in conjunction with the drawings.

In the drawings:

FIG. 4 is an enlarged plan view of the pivotal frame carrying the brush.

FIG. 5 is a perspective view of the support structure, pivotal frame, and brush assembly.

FIG. 6 is a plan view of a brush for use in accordance with the present invention.

FIG. 7 is a cross-sectional view taken at line 7—7 of FIG. 6.

FIG. 8 is an enlarged plan view of the central portion of the brush shown in FIG. 6 with portions broken away.

FIG. 9 is a broken view taken at 9—9 of FIG. 8 of the central portion of the brush shown in FIG. 8.

FIG. 10 is a perspective view of one vertical row of bristles used in the brush illustrated in FIGS. 6 through 9.

FIG. 12 is a plan view of an installation to illustrate the brush apparatus substantially extended to wash a portion of the front of the vehicle.

FIG. 13 is a view taken at 13—13 of FIG. 12.

FIG. 14 is a view taken at 14—14 of FIG. 12.

FIG. 15 is a partially diagrammatic plan view of a portion of the installation shown in FIG. 12 to illustrate the brush apparatus substantially retracted and beginning to wash the side of the vehicle.

FIG. 16 is a view taken at 16—16 of FIG. 15.

FIG. 17 is a partially diagrammatic plan view of the installation shown in FIG. 12 to illustrate the left hand brush washing the left side of the vehicle and the right hand brush beginning to wash the remainder of the front of the vehicle.

FIG. 18 is a view taken at 18—18 of FIG. 17.

FIG. 19 is a partially diagrammatic plan view of the installation shown in FIG. 12 with the left hand brush beginning to wash a portion of the rear of the vehicle and the right hand brush washing the right side of the vehicle.

FIG. 20 is a view taken at 20—20 of FIG. 19.

FIG. 23 is a top plan partially diagrammatic view of the installation shown in FIG. 12 to illustrate automatic brush motor shut-off to prevent damage to a radio aerial on the vehicle being washed.

FIG. 25 is a diagrammatic representation of the control system for operating the pivotal frame structure carrying the brush.

FIG. 26 is a diagrammatic representation of the electrical brush motor control circuit for preventing damage to radio aerials carried by the vehicle being washed.

Figure 1:
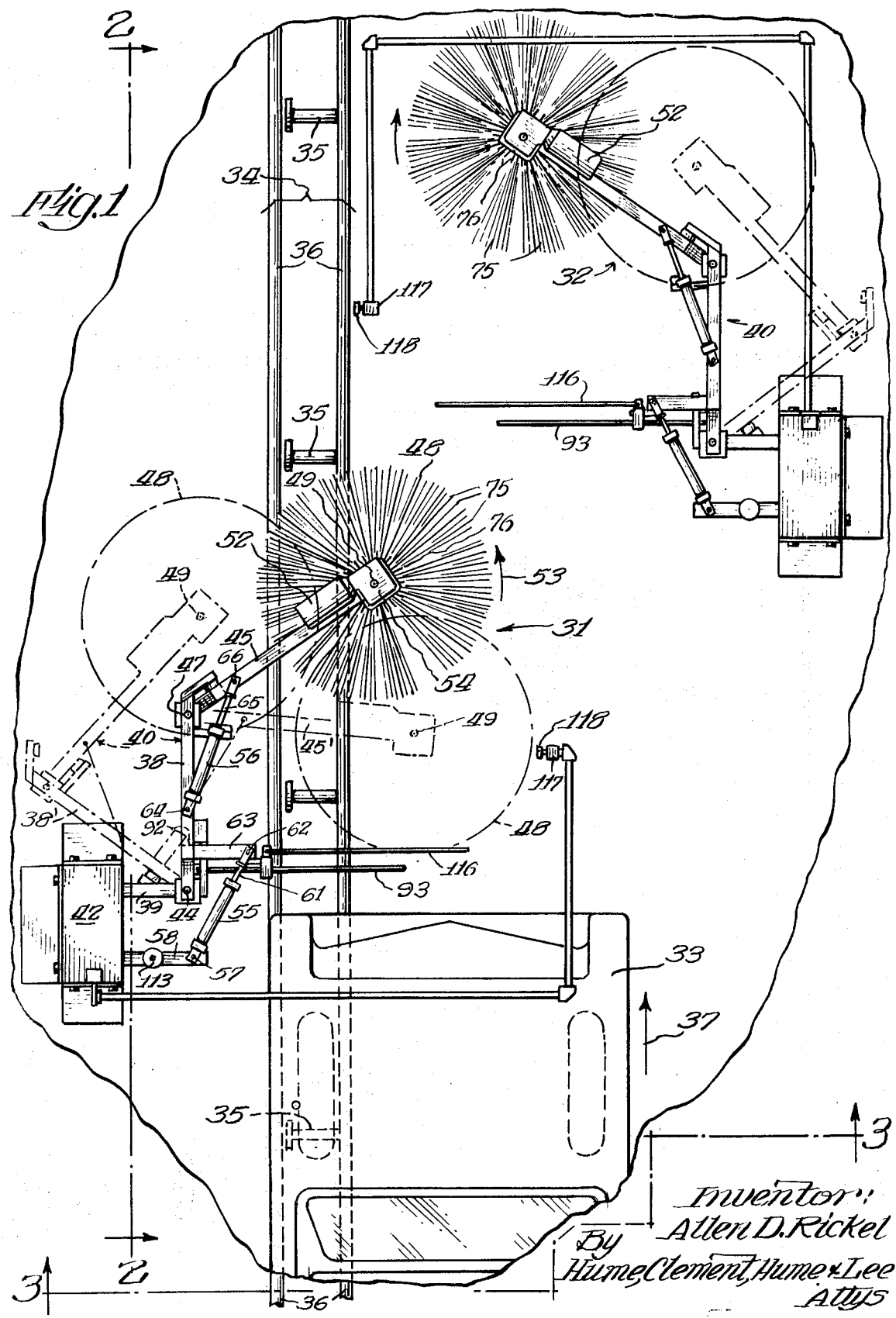
FIG. 1 is a plan view of an installation according to the present invention.

Referring to FIG. 1, an installation according to the present invention is shown with a left hand brush unit 31 of the wrap-around type for following and washing front, left side, and rear surfaces of the approaching automobile 33. A right hand brush unit 32 is laterally spaced from and staggered rearwardly of the left hand brush unit 31 for washing remaining front and rear surfaces as well as right side surfaces of the automobile 33. The two units 31 and 32 are preferably identical in structure and operation except that they are of opposite hand as shown.

A power driven automobile conveyor 34 is provided with rollers 35 for engaging the front left tires of the vehicles to be washed and moving the vehicles along a predetermined course between the brush units 31 and 32 at a predetermined speed in the direction indicated by the arrow 37 in FIG. 1. The elongate members 36 of the conveyor 34 guide the left side tires of the vehicles and thereby define the predetermined course of travel of the vehicles.

THE PIVOTAL FRAME STRUCTURE

Since the two brush units 31 and 32 are identical in structure, only the details of the pivotal frame structure 40 of the brush unit 31 will be described in detail, the brush unit 32 having a structure arranged for right hand operation.

The pivotal frame structure 40 of the brush unit 31 is best illustrated in FIGS. 4 and 5. As seen therein, it includes a primary generally rectangular frame section 38 which is pivotally mounted at one end on rigid upper and lower support arms 39 and 41 which project from a support structure or standard 42. Suitable pillow blocks 43 are provided for receiving vertical pivot pins 44 to facilitate horizontal pivotal or swinging movement of the primary frame section 38 relative to the support structure 42.

A secondary generally rectangular frame section 45 is pivotally mounted at one end on the free end of the inner frame section 38. Again suitable pillow blocks 46 are provided for receiving the vertical pivot pins 47 to facilitate horizontal pivotal or swinging movement of the secondary frame section 45 relative to the primary frame section 38.

The brush 48 itself is mounted on the free end of the secondary frame section 45 by a vertical shaft 49 received within pillow blocks 51 for driven rotation about the vertical axis defined by the shaft 49. A suitable electric motor 52 of about 1-½ horsepower operating through a speed reduction gear box 54 rotates the brush 48 in the counterclockwise direction indicated by the arrow 53. Details of the structure and action of the brush 48 will be described further on.

To operate the pivotal frame structure 40 there is provided a pair of piston-and-cylinder units 55 and 56. The primary piston-and-cylinder unit 55 is interconnected between the base structure 42 and the primary pivotal frame section 38. Specifically, it is pivotally attached at its head end by a pin 57 to a third rigid arm 58 projecting from the support structure and pivotally attached at the end of its piston rod 61 by pin 62 to a member 63 which is rigid with the primary frame section 38 and projects horizontally therefrom at right angles.

The secondary piston-and-cylinder unit 56 is interconnected between the primary pivotal frame section 38 and the secondary pivotal frame section 45. At its head end, it is pivotally attached to the primary frame section 38 by a pin 64 at a point approximately equidistant from the ends of the frame section 38. The end of the piston rod 65 is pivotally attached to the secondary pivotal frame section 45 by a pin 66 at a point approximately one-fourth of the distance from the pivot end to the free end of the frame section 45. Details of the operation and control of the piston-and-cylinder units 55 and 56 will be described further on.

In order to define the angular extent of pivotal movement of the primary pivotal frame section 38, a pair of limit stop members 67 and 68 are rigidly affixed to the upper support arm 39 to define, respectively, the extended and retracted angular limit positions of the primary pivotal frame section 38. Bumpers 69 and 70 of rubber or other resilient material are mounted on the limit stop members 67 and 68, respectively, to cushion abutment of the primary frame section against the respective limit stop members. It should be noted that in its extended position as shown in elevation in FIG. 1, the primary frame section 38 from its pivot point to its free end is oriented substantially in the direction of travel of the automobile 33, whereas in its retracted position, the primary frame section is oriented outwardly away from the course of travel of the automobile 33 at an angle of approximately 53°. The primary frame section in its retracted position in FIG. 4 is denoted by the reference numeral 38'.

Similarly, a pair of limit stop members 71 and 72 are provided to define the angular extent of pivotal movement of the secondary frame section 45 relative to the primary frame section 38. The limit stop 71 is rigidly affixed to the primary frame section 38 near the free end thereof to define the retracted limit position of the secondary frame section 45 which is denoted by the reference numeral 45' in FIG. 4. In its fully retracted position, the secondary frame section extends inwardly toward the course of travel of the automobile 33 at an included angle of approximately 85° with respect to the primary frame section. The limit stop 72 is rigidly affixed to the primary frame section 38, extending angularly from the free end thereof to define the extended limit position of the secondary frame section with respect to the primary frame section. As depicted in FIG. 4, the secondary frame section in its fully extended position extends inwardly at an included angle of approximately 120° with respect to the primary frame section. Bumpers 73 and 74 are mounted on the limit stop members 71 and 72, respectively, to cushion abutment of the secondary frame section against the limit stop members.

THE BRUSH STRUCTURE

Referring now to FIGS. 6 through 10, the unique brush structure of the present invention is illustrated. It is important to note that the brush 48 carries two forms of bristles: (1) long, relatively limp, pliant bristles 75; and (2) short, relatively stiff, resilient bristles 76. Both types of bristles are arranged in vertical rows and carried by a central support core assembly 77. The support core assembly 77 includes a circular plate 78 welded or otherwise rigidly affixed to the brush shaft 49 near the top thereof, and a like circular plate 79 similarly affixed to shaft 49 near the bottom thereof. A pair of elongate semi-cylindrical members 81 and 82 extend vertically from the top plate 78 to the bottom plate 79 and are rigidly clamped thereto. The semi-cylindrical members are each provided with outwardly projecting vertical fin elements 83 defining a plurality of vertical flutes or channels 84 which are generally trapezoidal in cross-sectional configuration as depicted in FIG. 8. The semi-cylindrical members are clamped to the circular plates by clamps 85 having fingers 87 which engage in respective spaces between the flutes 84 as shown in FIG. 8. The clamps 85 are secured to the circular plates by screws 86.

Figure 11:
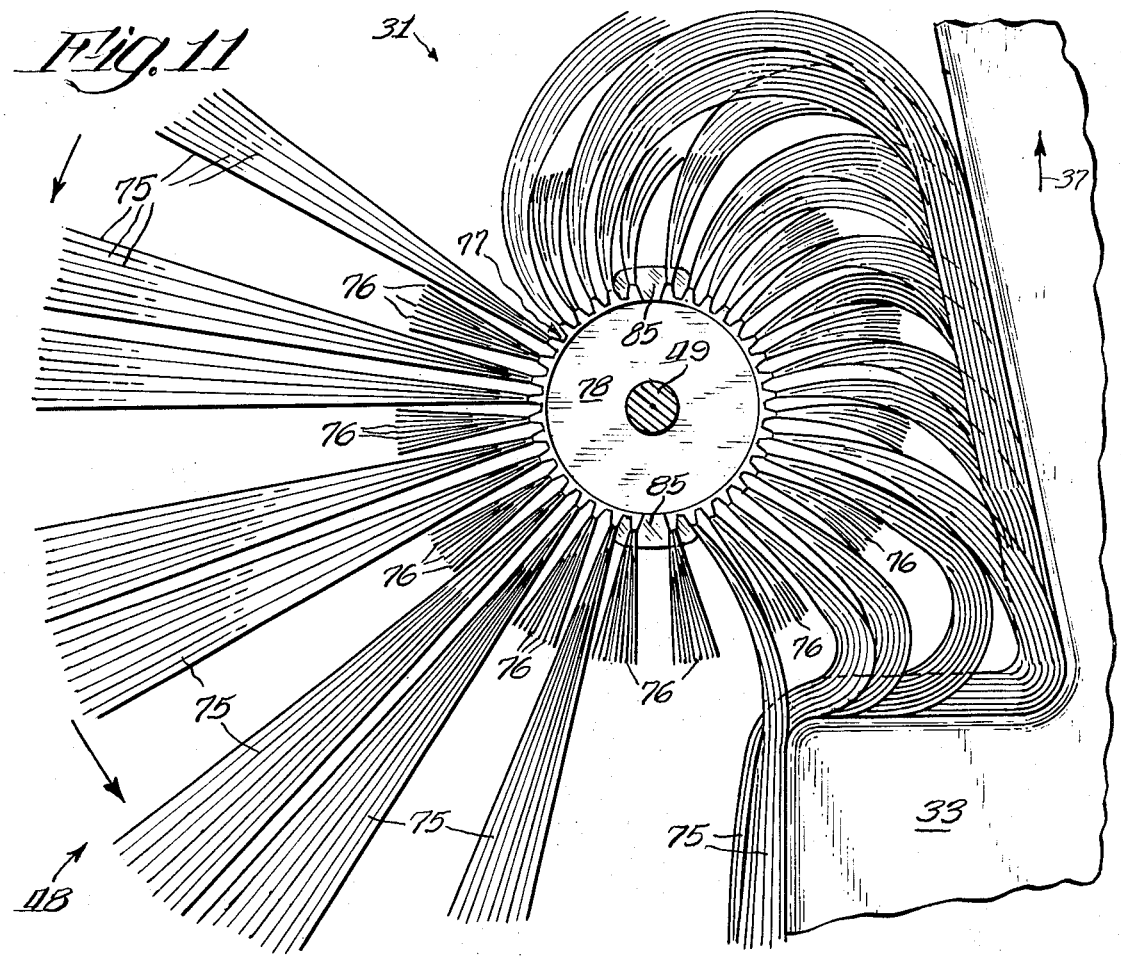
FIG. 11 is an enlarged plan view of the operation of the brush of the present invention in a frontal recess of the vehicle being washed.

The short stiff bristles 76 are preferably formed of nylon or like material and are arranged in row groups and fused or otherwise secured together at one end into elongate prismatic common base 88 having a trapezoidal cross-sectional configuration compatible with the flutes 84 as depicted in FIG. 10. Each row group is inserted into a selected flute 84 and locked therein by peening or bending over the top and bottom ends of the associated fins 83 in the manner depicted in FIG. 9. The long pliant bristles 75 are preferably formed of polyethylene or like material and are arranged in row groups and secured to the core assembly 77 in the same manner. As best illustrated in FIG. 11, there are more vertical rows of the long pliant bristles 75 than of the short stiff bristles 76, and the rows of short stiff bristles 76 are relatively uniformly interspersed among the rows of long pliant bristles 75. The short stiff bristles form a central cushioning core of approximately 1 foot in diameter for preventing damage to the vehicle being washed and preventing the brush from becoming trapped in frontal recesses in the vehicle as will be discussed further on.

THE PIVOTAL FRAME CONTROLS

Referring to FIG. 5, it should be noted that the primary frame section 38 carries a limit switch 89 adjustably secured on a plate 91 rigidly affixed to the vertical member 92 of the primary frame section. Affixed to the movable element of the limit switch is a relatively stiff, resilient sensing wand 93 of about 42 inches in length. This wand is located approximately 26 inches above the floor level and extends perpendicularly into the course of travel of the vehicle to be washed when the primary frame section 38 is in its extended position as shown in FIG. 1. The limit switch 89 is a normally-open, spring-returned limit switch adjusted to close upon approximately 10° angular counterclockwise travel of the wand 93 relative to the limit switch and to permit an additional 75° of angular overtravel by the wand. The function of this arrangement is to sense the approaching vehicle and initiate retraction of the secondary pivotal frame 45 as the front of the vehicle approaches the brush 48. This will be better understood by reference to FIG. 25 which provides a diagrammatic representation of the pivotal frame control system.

As shown in FIG. 25, the normally-open limit switch 89 is electrically connected in series with a solenoid-operated three-way valve 94 across line voltage terminals 95. As will be further described, closure of the limit switch 89 causes the rod side of the secondary piston-and-cylinder unit 56 to become pressurized to urge the secondary frame toward its retracted position.

Giving consideration to the general arrangement of the pivotal frame control system shown in FIG. 25, it is seen that it includes a pressure regulator 96 connected at its input to a suitable supply source of air under pressure, such as a compressor, for providing air at its output at a regulated pressure of approximately 100 p.s.i. The output of the pressure regulator 96 is connected via a conduit 97 to the input port 98 of the solenoid-operated three-way valve 94. The output port 99 of the three-way valve is connected via a conduit 101 and an adjustable flow control valve 102 to the piston rod side of the secondary piston-and-cylinder unit 56. When the three-way valve 94 is in its normal or closed position, that is, when the solenoid portion of the valve is deactivated by opening of the limit switch 89, the output port 99 is connected to an exhaust port 104. The head side of the piston-and-cylinder unit 56 is constantly maintained at atmospheric pressure by a vent port 105.

A branch conduit 106 leads from the pressure regulator 96 to a pressure reducer 107, the output of which is connected via a conduit 109 and adjustable flow control valve 108 to the rod side of the primary piston-and-cylinder unit 55. The pressure reducer 107 output is preferably set at 15 p.s.i. Thus, there is constant pressure on the primary piston-and-cylinder unit 55 urging the primary frame section toward its extended position. The head side of the primary piston-and-cylinder unit 55 is connected via an adjustable flow control valve 111 and conduit 112 to a fluid reservoir 113 which is substantially completely filled with hydraulic fluid when the piston-and-cylinder unit 55 is completely retracted. The top of the reservoir 113 is vented to atmosphere by vent 114.

The three flow control valves 102, 108, and 111 are of the type comprising an adjustable restriction needle valve in parallel with a check valve as illustrated diagrammatically in FIG. 25. The Series J valves sold by Alkon Products Corporation are suitable flow control valves of this type. It should be noted that the flow control valve 102 has its check valve portion 102a oriented to pass return flow from the rod side of the cylinder unit 56, thereby enabling quick exhaust of the cylinder unit 56. The flow control valve 108 has its check valve portion 108a oriented to pass return flow from the rod side of the cylinder unit 55 to prevent excessive pressure build-up in the rod side of the cylinder unit 55. The flow control valve 111 has its check valve portion 111a oriented to pass flow from the head side of the cylinder unit 55. The flow control valve 111 thereby serves to check or cushion extension of the cylinder unit 55 while offering little resistance to retraction of the cylinder unit 55.

THE MOTOR CONTROL CIRCUIT

Referring again to FIGS. 1 and 2, it is important to note the provision of a radio aerial sensing limit switch 115 and associated wand 116 mounted on the forward end of the arm 63 of the primary frame section 38. The limit switch 115 is a normally closed, spring-returned limit switch. The wand 116 is approximately 40 inches in length. It is positioned approximately 4 feet above the floor level and projects perpendicularly into the course of travel of vehicles to be washed when the primary pivotal frame section 38 is in its extended position. A 10° counterclockwise angular movement of the wand 116 relative to the limit switch will open the limit switch, and an additional 75° of angular overtravel of the wand 116 is provided by the limit switch.

It is also important to note the provision of a second windshield or upper body structure sensing limit switch 117 and associated wand 118 mounted on a suitable support above height of the top of vehicles to be washed. The limit switch 117 is a normally-open, spring-returned limit switch also having a 10° angular actuation and an additional 75° angular overtravel. The wand 118 projects vertically downwardly into the course of travel of the vehicles being washed. The tip of the wand 118 is preferably approximately 4 feet from the floor level and is normally disposed at a point approximately 22 inches rearwardly of the forward-most position of the aerial sensing wand 116 when the primary frame section 38 is in its extended position.

Turning now to FIG. 26, the motor control circuit including the limit switches 115 and 117 is shown diagrammatically. As seen, the brush motor operating circuit 119 is connected across the line voltage terminals 121 in series with a line switch 123 and the contacts 122 of a relay 124. The relay 124 has a time delay in closing of, for example, 4 or 5 seconds. The normally-closed limit switch 115 is connected across the line terminals 121 in series with the operating coil 125 of the time-delayed closing relay. The normally-open limit switch 117 is connected across the line terminals 121 in series with the operating coil 127 of a control relay 126. A first set of contacts 128 of the control relay 126 is connected in parallel with the limit switch 115. A second set of contacts 129 is connected in parallel with the contacts 122 of the time-delayed relay.

OPERATION

Figure 2:
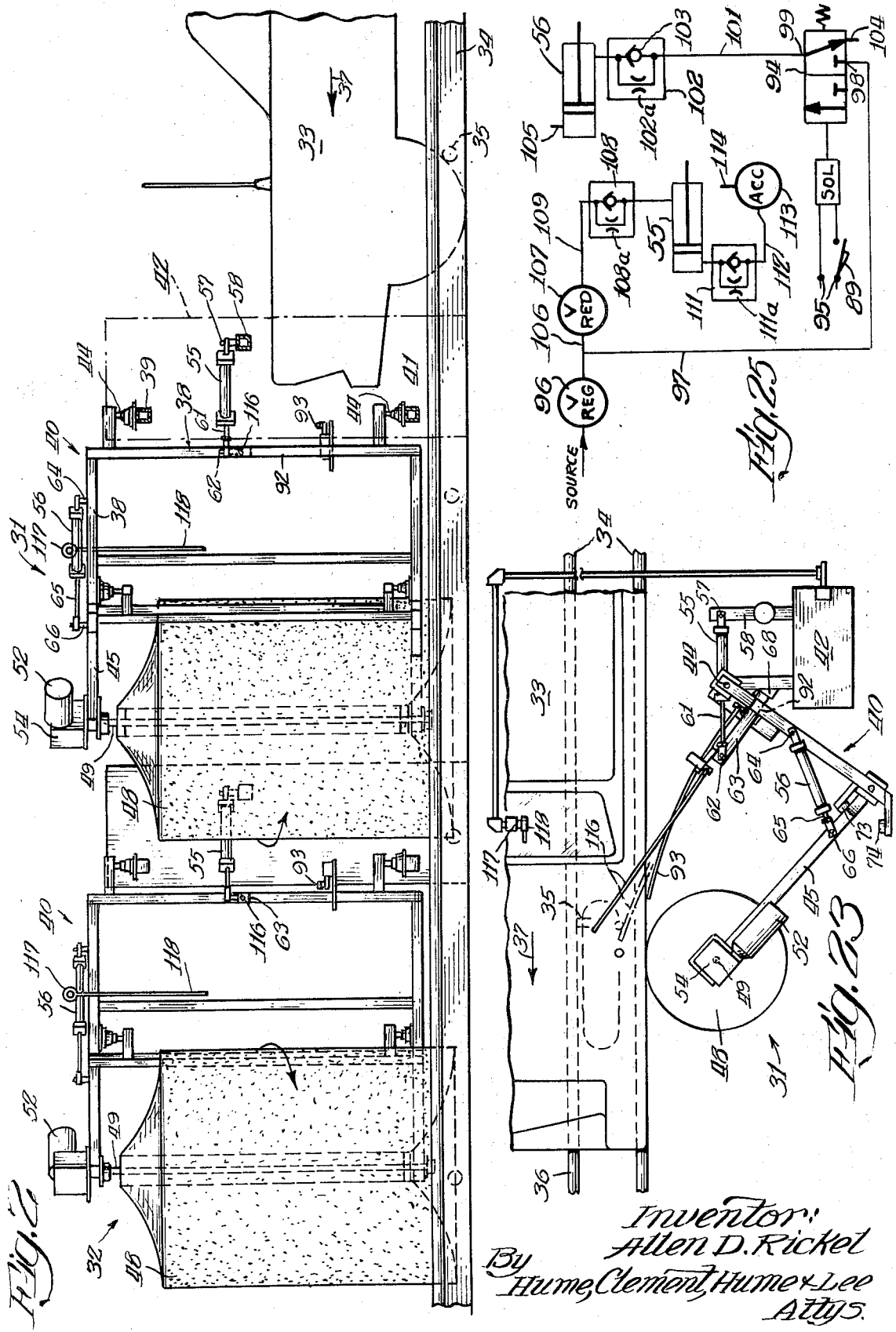
FIG. 2 is a partly elevational and partly cross-sectional view taken at 2—2 of FIG. 1.
Figure 3:
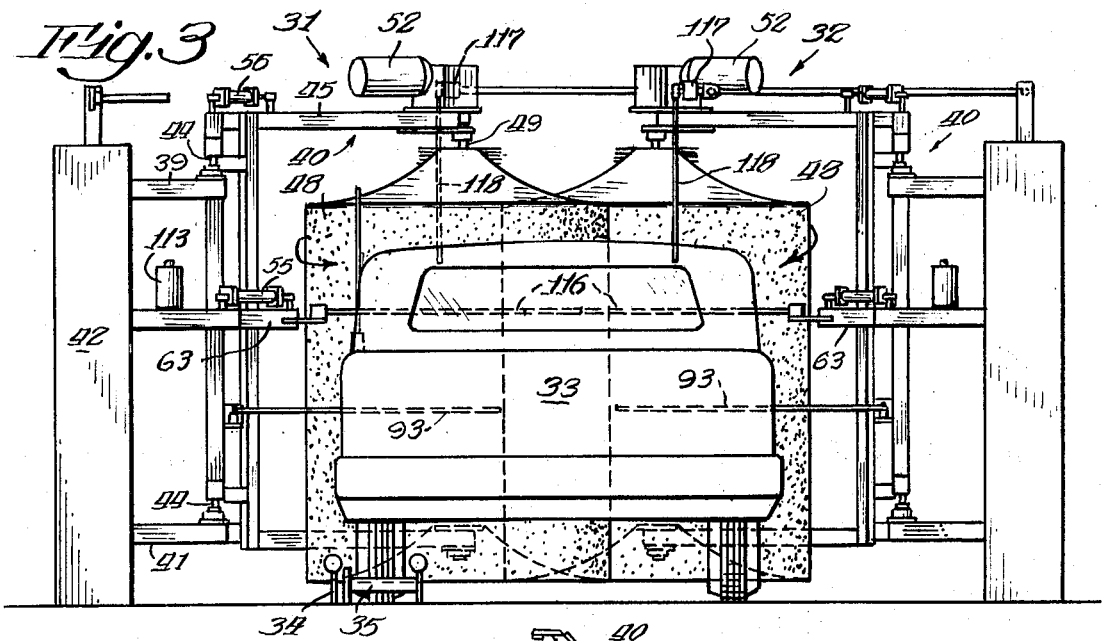
FIG. 3 is an end elevational view taken at 3—3 of FIG. 1.

In FIGS. 1 through 3, the automobile 33 is being conveyed in the direction indicated by the arrow 37 and is approaching the left hand brush unit 31. The pivotal frame section 38 is in its extended position due to the normally-retracted condition of the primary piston-and-cylinder unit 55. There is no air pressure on either side of the secondary piston-and-cylinder unit 56. However, the secondary frame unit 45 is in its extended position since this is the final position assumed in the washing cycle performed by the brush unit 31 on the preceding vehicle. Moreover, the reaction force moment on secondary frame unit 45 due to driven rotation of the brush 48 in the counterclockwise direction urges the secondary frame section toward its extended position.

Prior to contacting the brush 48, the automobile closes the normally-open limit switch 89 by contacting and moving the wand 93 rearwardly in a counterclockwise direction. This serves to actuate the solenoid-operated valve 94 (FIG. 25) pressurizing the rod side of the secondary piston-and-cylinder unit 56 to cause the unit 56 to retract. The rate at which the secondary piston-and-cylinder unit retracts can be varied by adjustment of the flow control valve 102 (FIG. 25). In this way the elbow joint formed by primary and secondary frame sections 38 and 45 is buckled, advancing the secondary frame section 45 toward the automobile 33 to its retracted position denoted as 45' in FIG. 1 and moving the brush 48 into contact with the front of the automobile 33.

In FIG. 12, the automobile 33 and the brush 48 have come into contact, and the brush 48 is washing the front of the automobile.

At this juncture it is important to note that the interrelationship between the direction and speed of rotation of the brush 48 and the effective diameter of the brush is a critical factor both in the operation and cleaning action of the brush units. As previously noted, the brush 48 of the left hand unit 31 is rotated in a counterclockwise direction. This may also be referred to as rotation in or with the direction of movement of the vehicle being washed, that is, when the brush 48 is washing the side of the vehicle, bristles in contact with the vehicle are moving in the same direction as the vehicle, albeit much faster. Accordingly, in right hand brush units such as the unit 32, the brush must be rotated clockwise as indicated in FIG. 12. The relationship between the speed and effective diameter of the brush may be expressed in terms of the speed at which the tips of the long bristles 75 move when not in contact with a surface of the vehicle. For a conventional conveyance speed of 20 to 65 feet per minute of the vehicle past the brush unit, the speed of the outer bristle tips should be within the range of from approximately 690 feet per minute to approximately 943 feet per minute with the preferred speed being approximately 855 feet per minute. By way of example, the invention has been successfully practiced with a brush 48 having an effective diameter under rotation of 48 inches and at a rotational speed of 68 to 70 revolutions per minute to provide a bristle tip speed of approximately 855 feet per minute.

If the 48 inch diameter brush 48 is rotated slower than 55 revolutions per minute so that the speed of the tips of the long bristles is less than 690 feet per minute, the cleaning action of the brush is impaired. Moreover, the wrap-around operation of the brush unit itself is impaired if the speed is too slow. By way of explanation, it has been found that the rotation of the brush 48 against vertical surfaces of the vehicle develops a force on the brush 48 drawing the brush against the vehicle. This drawing effect is employed in the present invention to maintain the brush 48 in contact with the vehicle as the vehicle moves past the brush unit, particularly in washing the rear of the vehicle. The drawing effect varies with the speed of rotation of the brush 48. Hence, if the 48 inch brush is rotated too slowly — below 55 revolutions per minute — the drawing effect on the brush is impaired in addition to poorer cleaning action. If the 48 inch brush is rotated at too great a speed — above 70 revolutions per minute — the drawing effect is too great, and the brush can damage the automobile surfaces and elements such as rear view mirrors projecting from the automobile.

Returning to FIGS. 12 through 14, it should be noted that the brush 48 cleans the left half of the front end of the automobile. On many cars, the brush 48 may, in fact, overlap and clean an appreciable portion of the right half of the front. Moreover, the brush overlaps and cleans an appreciable portion of the hood surface.

Figure 21:
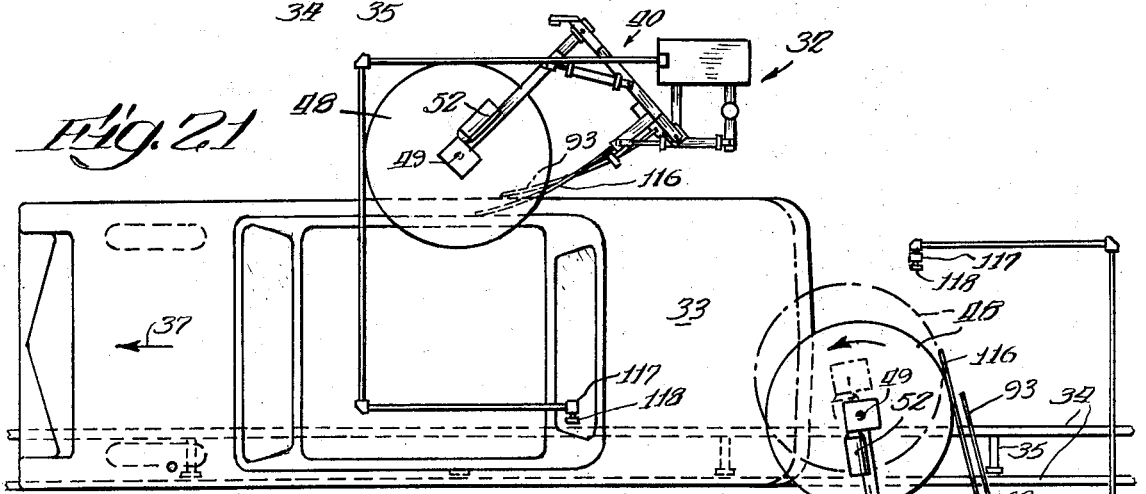
FIG. 21 is a partially diagrammatic plan view of the installation shown in FIG. 12 to illustrate the left hand brush completing its washing cycle.
Figure 22:
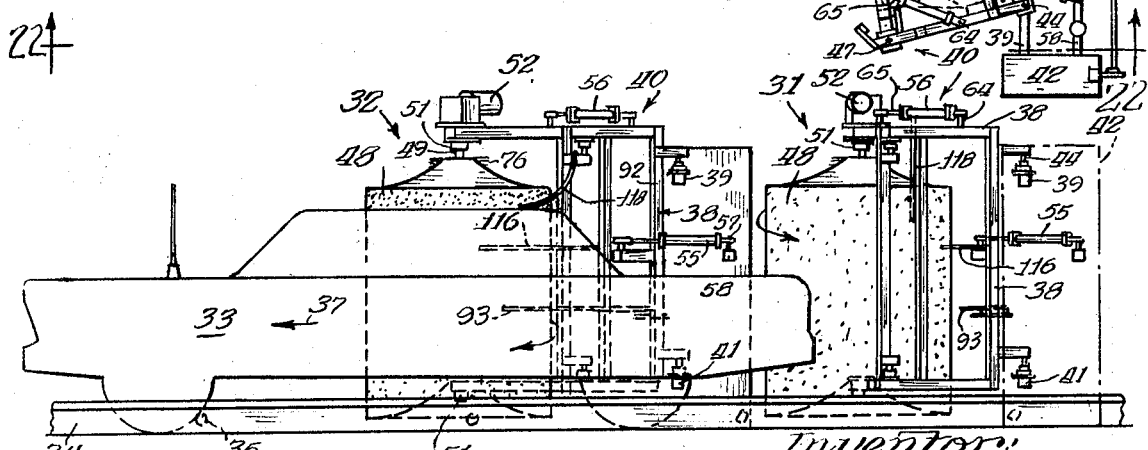
FIG. 22 is a view taken at 22—22 of FIG. 21.

Due to the continuing advance of the automobile 33, the brush 48 is forced rearwardly and to the left across the front of the automobile 33 compatibly with the direction of rotation of the brush 48. The complete pivotal frame 40 swings outwardly about the pivot pins 44 and against the bias exerted by the primary piston-and-cylinder unit 55 to the substantially retracted position illustrated in FIGS. 15 and 16. The pivotal frame 40 remains in this substantially retracted position as the side of the automobile 33 proceeds past the brush 48, as illustrated in FIGS. 17 through 20. It should be noted that the wand 93 is substantially trapped between the brush 48 and the side of the automobile 33. As the rear of the automobile 33 passes the tip of the wand 93, the wand 93 is released, permitting the limit switch 89 to open. The wand 93 is aided in returning to its noncontact position by a flip from the brush 48 itself. When the limit switch 89 opens, the pressure on the rod side of the secondary piston-and-cylinder unit 56 is relieved to permit the secondary frame section 45 to move toward its extended position as the brush 48 washes the left half of the rear of the automobile 33 as illustrated in FIG. 21. The drawing force on the brush referred to previously causes the brush 48 to adhere to and follow the rear of the automobile 33 as it moves away from the brush unit 31, extending the secondary pivotal frame section 45 as depicted in FIGS. 21 and 22, the phantom view in FIG. 21 illustrating a position of the brush near the end of the washing cycle. The reaction force moment previously referred to also urges the frame section 45 toward its extended position. At the same time, the pneumatic bias exerted by the primary piston-and-cylinder unit 55 on the primary frame section 38 moves the primary frame section toward its extended position so that the brush 48 moves from left to right to clean the left half of the rear of the automobile 33. This movement from left to right is assisted by the rotation of the brush 48 itself against the rear of the automobile. When the washing cycle is completed, the pivotal frame assembly 40 will be completely extended.

Referring now briefly to FIG. 11, there is shown an enlarged view of the action of the brush 48 in a frontal recess of the automobile 33. The short relatively stiff, resilient bristles 76 prevent the longer pliant bristles 75 from being wrapped tightly against the central support core assembly 77 and act as a cushion to prevent damage to the automobile or to the brush. Significantly, the stiff bristles 76 will tend to "walk" the brush out of the frontal recess due to the direction of rotation of the brush 48 if the brush enters too far into the frontal recess.

It is important to understand that the brush 48 will clean appreciable portions of the horizontal hood, fender top, roof, and rear trunk deck surfaces of the automobile 33, since it conforms to the profile of the automobile. This profile conformation is particularly important as the brush washes the side of the automobile which may have various undulations and contours. The washing action is complete and yet gentle. The brush 48 itself has a vertical dimension of at least 60 inches and is mounted on the pivotal frame assembly 40 which is spaced 9 inches from the floor level. Taking into account the droop of the long bristles 75 even under rotation, the brush 48 extends from below the underbody surfaces to above and onto the roof surface of automobiles. Thus, the surfaces which are not washed by the brushing units 31 and 32 can be easily reached by an overhead horizontal brush.

Because the brush 48 conforms to the left side profile of the automobile 33 from roof to underbody surfaces as it washes with appreciable overlap onto the hood, fender top, and rear trunk deck surfaces, it would tend to engage radio aerials mounted on the left side of the automobile. Since engagement of an aerial by the rotating brush 48 may damage the aerial, the aerial sensing wand 116 has been provided. When this wand is moved counterclockwise by contact with a radio aerial, the limit switch 115 is opened, de-energizing the relay coil 125. In this connection it should be noted that the wand 116 will be angled rearwardly to a position slightly in advance of the brush 48 when contacted by conventionally positioned radio aerials due to the fact that the primary pivotal frame section 38 will be in its retracted position. This position of the wand 116 is illustrated, for example, in FIG. 15. Thus, the brush motor 52 will be de-energized as the brush 48 reaches the aerial. The long pliant bristles 75 droop as the rotational speed of the brush 48 drops, thereby reducing the effective diameter of the brush to miss the aerial, as illustrated in FIG. 23. When the aerial leaves the tip of the wand 116, the limit switch 115 closes activating the relay coil 125 to initiate the time-delayed closing cycle of the relay 124. Thus, the motor 52 restarts after a 4 to 5 second delay for resumption of normal washing operation with the bristles 75 fully extended.

Since the aerial sensing wand 116 will also normally contact the upper body structure of the automobile 33 (i.e., the portion of the body structure which extends above the hood level), provision has been made to override the limit switch 117 in this event. The override means comprises the limit switch 117 operated by the windshield sensing wand 118. When the windshield sensing wand 118 strikes the windshield of the automobile 33, the limit switch 117 actuates the relay 126 closing the contactors 128 and 129. Thus, the time-delayed relay 124 is shunted to maintain the brush motor 52 running yet permits the time-delayed relay 124 to run out its timing cycle. The windshield sensing wand 118 tip is preferably located so that it overrides the time-delayed relay 124 as or just before the brush 48 reaches the point on the windshield or other upper body structure of the automobile 33 which contacted the aerial sensing wand 116 so as to override the time-delayed relay 124 as or just before it opens, thereby achieving the override function without impairing the aerial sensing function with respect to aerials spaced closely in advance of the windshield of the automobile. The position of the aerial sensing wand 116 is depicted in FIGS. 1 and 2.

Because of its position and orientation, the wand 118 will normally be released by the upper body structure of the automobile shortly after release of the aerial sensing wand 116 permitting the brush motor 52 to be momentarily de-energized on contact by the wand 116 with rear mounted aerials.

Figure 24:
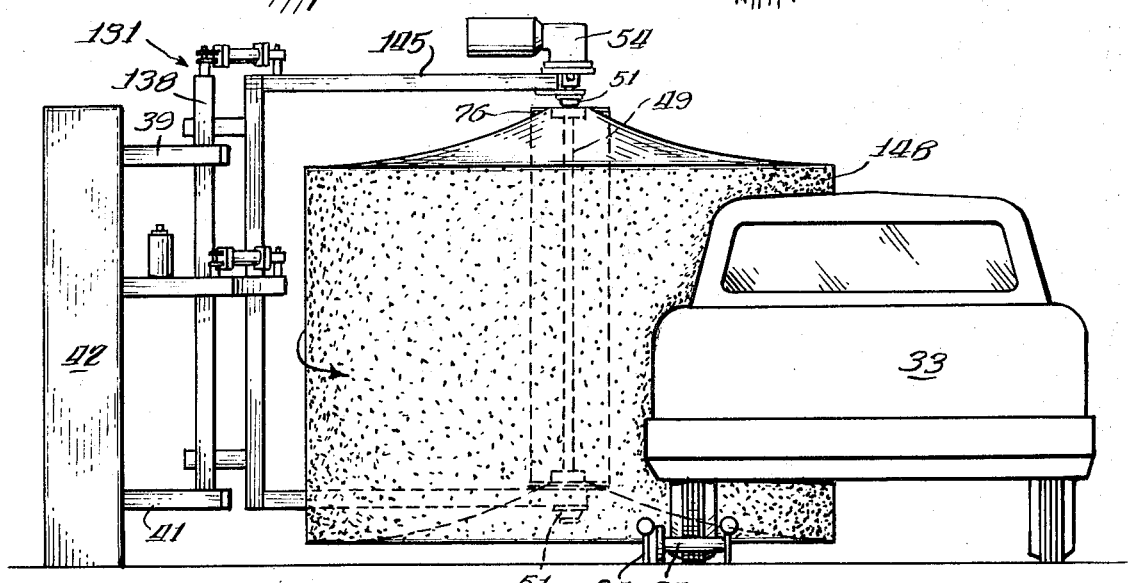
FIG. 24 is an end view in elevation of another form of vertically-oriented brush having an effective radius greater than the width of the vehicle.

In FIG. 24, there is shown a brush unit 131 which is identical with the same form of pivotal frame action and mode of operation as the brush unit 31 previously described except that the effective diameter of the brush 148 under rotation is approximately 84 inches. The rotational speed of the brush 148 is preferably about 40 revolutions per minute so as to come within the speed range previously referred to. Obviously, the dimensions of the primary and secondary pivotal frame sections 138 and 145 will differ from the dimensions used in the case with the smaller 48 inch brush previously described. The advantage of the larger brush 148 is that it will overlap and wash much greater portions of the hood, roof, and rear deck surfaces of the automobile so that only a small, inexpensive overhead horizontal brush need be employed to wash the areas not reached by the brush 148 on large width vehicles.

For the sake of brevity, the various water and detergent sprays employed to wet the surface of the vehicles being washed have not been shown or described. It should be understood that various conventional arrangements for such sprays may be used in conjunction with the present invention.

While certain preferred forms of the present invention have been described and illustrated, it is to be understood that this is merely by way of example and is not to be construed in any manner as a limitation. It is contemplated that modifications may be made within the scope of the claims without departing from the spirit of the invention.

What is claimed is:

1. In apparatus for washing a vehicle being conveyed, the combination comprising: a support structure; a first frame section mounted on said support structure for horizontal pivotal movement between an extended position and a retracted position, said first frame section from its pivot point to its free end being oriented in substantially the same direction as the direction in which said vehicle is being conveyed when said first frame unit is in said extended position, the free end of said first frame unit being pivoted away from said vehicle when said first frame section is in its retracted position; a second frame section mounted in said first frame section adjacent the free end thereof for horizontal pivotal movement between an extended position and a retracted position, said second frame section from its pivot point to its free end being oriented at an obtuse angle from said first frame section when said second frame section is in its extended position, said second frame section being at an acute angle from said first frame section when said second frame section is in its retracted position; a brush mounted on said second frame section adjacent the free end thereof for rotation about a vertical axis, said brush having a vertical dimension such that it extends from below the underbody surfaces to above the roof surfaces of said vehicle, said brush having a multiplicity of relatively limp, pliant bristles; means for rotating said brush in the direction said vehicle is being conveyed and at a speed of rotation such that said relatively limp, pliant bristles are caused to extend outwardly under centrifugal force and such that the action of said brush on substantially vertical surfaces of said vehicle tends to draw said brush toward said vehicle; means connected between said support structure and said first frame section for urging said first frame section pivotally toward said vehicle; means connected between said first frame section and said second frame section for urging said second frame section pivotally toward said first frame section when activated; and means for activating said last named means prior to contact with said brush by the front end of said vehicle when the same is approaching to be washed and for deactivating said last named means upon completion of passage of the adjacent side of said vehicle past said brush whereby said brush follows and washes front, side, and rear surfaces of said vehicle conforming to the profile of the vehicle and overlapping onto hood, fender top, roof, and rear deck surfaces of the vehicle.

2. In apparatus for washing a vehicle, the combination with the apparatus defined in claim 1 comprising second apparatus identical therewith but of opposite hand and spaced therefrom and staggered therewith and means for conveying said vehicle along a predetermined path past and between said first mentioned apparatus and said second apparatus.

3. The combination defined in claim 1 further comprising means for checking pivotal movement of said first frame section relative to said support structure.

4. The combination defined in claim 3 wherein said means for urging said second frame section pivotally toward said first frame section when activated comprises pneumatic piston-and-cylinder means and said means for activating said last named means comprises a source of supply pressure, a solenoid-operated three-way valve having an input port connected to said source of supply pressure, an exhaust port vented to atmosphere, and an outlet port connected to one side of said piston-and-cylinder unit, the opposite side of said piston-and-cylinder unit being vented to atmosphere, and a normally-open, spring-returned limit switch connected in series with the solenoid portion of said solenoid-operated valve, said limit switch having a projecting element adapted to close said limit switch prior to contact of said vehicle by said brush whereby said solenoid-operated valve is moved from a first position wherein said outlet port is connected to said exhaust port exhausting said one side of said piston-and-cylinder means to atmosphere to a second position wherein said outlet port is connected to said inlet port activating said piston-and-cylinder means by pressurizing said one side thereof.

5. The combination defined in claim 4 wherein said means for urging said first frame section pivotally toward said vehicle comprises second piston-and-cylinder means having one side in constant communication with said source of supply pressure and said means for checking pivotal movement of said first frame section relative to said support structure comprises a reservoir of hydraulic fluid, a restricted conduit interconnecting said chamber and the opposite side of said second piston-and-cylinder means whereby extension of said second piston-and-cylinder means is checked by the restricted flow of hydraulic fluid through said conduit.

6. In apparatus for washing a vehicle being conveyed along a predetermined course and including a generally vertically-oriented rotatable brush carried on a frame for washing surfaces of said vehicle on one side thereof and a motor for driving said brush, the combination therewith comprising: aerial sensing means for momentarily de-energizing said motor upon contact sensing an aerial or other structure on said one side of said vehicle projecting above the height of the hood of said vehicle; and upper body sensing means for overriding said aerial sensing means upon contact sensing the upper body structure of said vehicle, aerial sensing means and said upper body sensing means being arranged and adjusted such that said motor is maintained energized during contact sensing of said upper body structure of said vehicle by said aerial sensing means.

7. The combination defined in claim 6 wherein said frame comprises: a first frame section mounted on a support structure for horizontal pivotal movement and a second frame section mounted on said first frame section for horizontal pivotal movement and said brush is mounted on said second frame section and is power driven in rotation about a vertical axis in the direction said vehicle is being conveyed, said brush having a vertical dimension such that it extends from below the underbody surfaces to above the roof surfaces of said vehicle, said brush having a multiplicity of relatively limp, pliant bristles which are caused to extend outwardly under centrifugal force, the action of said brush on substantially vertical surfaces of said vehicle tending to draw said brush toward said vehicle.

8. In apparatus for washing a vehicle being conveyed along a predetermined course, the combination comprising: a brush for washing said vehicle, a motor for driving said brush; first sensing means, including an element projecting substantially horizontally into the course of travel of said vehicle from one side thereof and at a height higher than the hood of said vehicle, for shutting off said motor when and so long as said projecting element of said first sensing means is in actuating contact with structure of said vehicle extending above the height of the hood of said vehicle; second sensing means, including an element projecting substantially vertically downwardly into the course of travel of said vehicle from a position higher than the roof of said vehicle to a point higher than the hood of said vehicle for overriding said first sensing means to maintain said motor running when and so long as said projecting element of said second sensing means is in actuating contact with structure of said vehicle extending above the height of the hood of said vehicle, said first and second sensing means being arranged and adjusted such that said brush motor is shut off momentarily to avert damage to aerials on said vehicle projecting above the height of the hood of said vehicle by actuating contact of said projecting portion of said first sensing means with said aerials yet said motor is maintained running despite contact by said projecting portion of said first means with the upper body structure of said vehicle due to actuating contact of said projecting portion of said second sensing means with said upper body structure of said vehicle.

9. The combination defined in claim 8 wherein said first sensing means comprises: a spring-returned, normally-closed limit switch connected to said projecting element of said first sensing means; and a relay having contacts connected in series with an operating circuit of said motor, said limit switch being connected in series with the coil of said relay such that the opening of said limit switch due to contact of said projecting element of said first sensing means with structure of said vehicle extending above the height of the hood thereof causes said relay to open.

10. The combination defined in claim 9 wherein said projecting element is positioned in advance of said brush and said relay is a time-delayed closing relay such that said relay closes a predetermined time after said limit switch is closed.

11. The combination defined in claim 10 wherein said second sensing means comprises a spring-returned, normally open limit switch connected to said projecting element of said first sensing means; and an override relay having a first set of contacts connected across said normally-closed limit switch and a second set of contacts connected across said time-delayed relay, said normally-open limit switch being connected in series with the coil of said normally-open relay such that the closing of said normally-open limit switch due to contact of said projecting element of said second sensing means with said upper body structure of said vehicle causes said first and second sets of contacts to close, overriding said first sensing means.

12. In apparatus for washing a vehicle being conveyed, the combination comprising: a support structure; a first frame section mounted on said support structure for horizontal pivotal movement; a second frame section mounted on said first frame section for horizontal pivotal movement; a brush mounted on said second frame section for rotation about a vertical axis, said brush having a vertical dimension such that it extends from below the underbody surfaces to above the roof surfaces of said vehicle, said brush having a multiplicity of relatively limp, pliant bristles; means for rotating said brush in the direction said vehicle is being conveyed and at a speed of rotation of approximately 55–70 revolutions per minute such that said relatively limp, pliant bristles are caused to extend outwardly under centrifugal force, said brush having an effective diameter of approximately 4 feet when said relatively limp, pliant bristles are extended by centrifugal force, whereby said brush is adapted to conform to the profile of the vehicle and such that the rotation of said brush against vertical surfaces of said vehicle tends to draw said brush toward said vehicle; means connected between said support structure and said first frame section for urging said first frame pivotally toward said vehicle; and means connected between said first frame section and said second frame section for urging said second frame section pivotally toward said first frame section when activated and means for activating said last named means prior to contact with said brush by the front end of said vehicle when the same is approaching to be washed and for deactivating said last named means with completion of passage of the adjacent side of said vehicle past said brush.

13. In apparatus for washing a vehicle being conveyed, the combination comprising: a frame mounted for horizontal pivotal movement; a brush mounted on said frame for rotation about a vertical axis, said brush having a vertical dimension such that it extends from below the underbody surfaces to above the roof surfaces of said vehicle, said brush having a multiplicity of vertical rows of relatively limp, pliant bristles; and means for rotating said brush in the direction said vehicle is being conveyed and at a speed of rotation of approximately 55–70 revolutions per minute such that said relatively limp, pliant bristles are caused to extend outwardly under centrifugal force, said brush having an effective diameter of approximately four feet when said relatively limp, pliant bristles are extended by centrifugal force whereby the action of said brush on substantially vertical surfaces of said vehicle tends to draw said brush toward said vehicle, said brush further having a multiplicity of vertical rows of radially extending, relatively stiff, resilient bristles interposed between said rows of relatively limp, pliant bristles, said resilient bristles being appreciably less in length than said relatively limp, pliant bristles so as to form an inner cushioning core in said brush.

* * * * *